(12) United States Patent
Balestrieri et al.

(10) Patent No.: US 9,262,306 B2
(45) Date of Patent: Feb. 16, 2016

(54) SOFTWARE APPLICATION TESTING

(75) Inventors: Filippo Balestrieri, Mountain View, CA (US); Matteo Monchiero, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1556 days.

(21) Appl. No.: 12/695,145

(22) Filed: Jan. 27, 2010

(65) Prior Publication Data

US 2011/0185231 A1    Jul. 28, 2011

(51) Int. Cl.
G06Q 99/00    (2006.01)
G06F 11/36    (2006.01)
G06F 21/53    (2013.01)

(52) U.S. Cl.
CPC ............ *G06F 11/3672* (2013.01); *G06F 21/53* (2013.01); *G06F 2221/2149* (2013.01)

(58) Field of Classification Search
CPC .............................. G06F 11/3672; G06F 21/53
See application file for complete search history.

(56) References Cited

U.S. PATENT DOCUMENTS

| | | | |
|---|---|---|---|
| 5,731,991 A | 3/1998 | Kinra | |
| 5,850,511 A * | 12/1998 | Stoecker et al. | 714/38.1 |
| 6,473,794 B1 | 10/2002 | Guheen | |
| 6,546,397 B1 * | 4/2003 | Rempell | |
| 6,766,481 B2 | 7/2004 | Estep | |
| 6,839,680 B1 | 1/2005 | Liu et al. | |
| 6,862,696 B1 | 3/2005 | Voas | |
| 7,111,282 B2 | 9/2006 | Stephenson | |
| 7,627,486 B2 | 12/2009 | Musgrove | |
| 2003/0101449 A1 | 5/2003 | Bentolila et al. | |
| 2004/0106088 A1 * | 6/2004 | Driscoll et al. | 434/118 |
| 2004/0254822 A1 | 12/2004 | Mandelbaum | |
| 2004/0254836 A1 * | 12/2004 | Emoke Barabas et al. | 705/14 |
| 2004/0255137 A1 | 12/2004 | Ying | |
| 2007/0033092 A1 | 2/2007 | Iams | |
| 2007/0055629 A1 | 3/2007 | Collins | |

(Continued)

FOREIGN PATENT DOCUMENTS

WO    2009024373 A2    2/2009

OTHER PUBLICATIONS

"Automated Testing in Virtual Labs", SmartBear website, all pages, date unknown, http://support.smartbear.com/articles/testcomplete/automated-testing-in-virtual-labs/.*

(Continued)

*Primary Examiner* — Calvin Cheung
(74) *Attorney, Agent, or Firm* — Hewlett Packard Enterprise Patent Department

(57) ABSTRACT

An online marketplace for distributing software applications is established. From the online marketplace, devices are enabled to select respective ones of the software applications and initiate testing of the selected software applications in connection with testing tools operating in respective secure testing environments that shield the devices from potential adverse effects arising from testing the selected software applications. The testing tools generate testing data relating to one or more criteria for certifying the selected software applications. For each of one or more of the selected software applications, a determination is made whether or not to classify the software application as a certified software application based on an evaluation of the testing data generated during the testing of the software applications initiated by a plurality of the devices.

20 Claims, 4 Drawing Sheets

(56) References Cited

U.S. PATENT DOCUMENTS

| | | | |
|---|---|---|---|
| 2007/0115929 A1 | 5/2007 | Collins | |
| 2007/0255576 A1 | 11/2007 | Patterson | |
| 2007/0260831 A1* | 11/2007 | Michael et al. | 711/162 |
| 2008/0126176 A1 | 5/2008 | Iguchi | |
| 2008/0168433 A1* | 7/2008 | Arnold et al. | 717/158 |
| 2009/0007105 A1* | 1/2009 | Fries et al. | 718/1 |
| 2009/0100412 A1* | 4/2009 | Weiss | 717/124 |
| 2009/0100420 A1* | 4/2009 | Sapuntzakis et al. | 717/171 |
| 2010/0115512 A1* | 5/2010 | Sakai | 718/1 |
| 2010/0146523 A1* | 6/2010 | Brigaut et al. | 719/330 |
| 2010/0180272 A1* | 7/2010 | Kettler et al. | 717/171 |
| 2010/0180344 A1* | 7/2010 | Malyshev et al. | 726/23 |
| 2010/0192224 A1* | 7/2010 | Ferri et al. | 726/23 |

OTHER PUBLICATIONS

Nokia Beta Labs, Nokia Corporation, 11 pages, downloaded from http://betalabs.nokia.com/about (Jan. 24, 2014).

International Search Report and Written Opinion in counterpart International Application No. PCT/US2010/034446 (mailed Mar. 2, 2011).

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

SOFTWARE APPLICATION TESTING

BACKGROUND

The success of software application marketplaces depends on their ability to supply large quantities of high quality products. The "quality" of each product typically is verified through costly software application quality control testing and certification processes. In the presence of time and budget constraints, a marketplace manager typically prioritizes the selection of which new products to test based on the goal of maximizing future sales. Often, this selection has to be made in the absence of any information about the future popularity and profitability of a candidate new product.

What is needed are improved systems and methods of testing software applications

DETAILED DESCRIPTION

Figure 1:
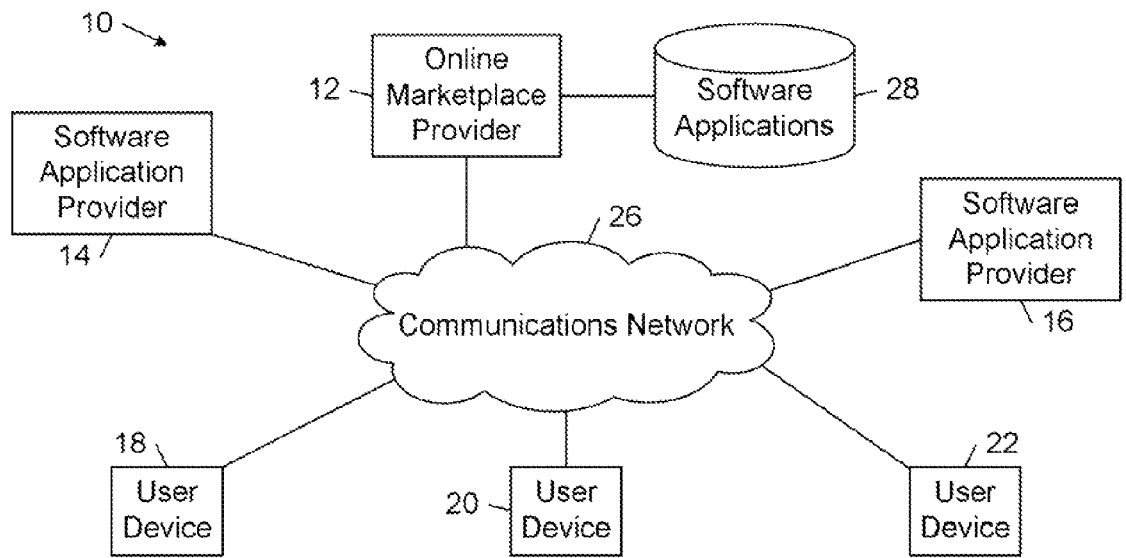
FIG. 1 is a block diagram of an example of an embodiment of a software application testing environment 10.

In the following description, like reference numbers are used to identify like elements. Furthermore, the drawings are intended to illustrate major features of example embodiments in a diagrammatic manner. The drawings are not intended to depict every feature of actual embodiments nor relative dimensions of the depicted elements, and are not drawn to scale.

I. DEFINITION OF TERMS

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

A "network node" (also referred to simply as a "node") is a junction or connection point in a communications network. Example network nodes include, but are not limited to, a terminal, a computer, and a network switch. A "server" network node is a host computer on a network that responds to requests for information or service. A "client" network node is a computer on a network that requests information or service from a server. A "network connection" is a link between two communicating network nodes.

A "database" is an organized collection of records that are presented in a standardized format that can be searched by computers. A database may be stored on a single computer-readable data storage medium on a single computer or it may be distributed across multiple computer-readable data storage media on one or more computers.

The term "online marketplace" refers to any type of electronic system for buying and selling products or services over one or more computer networks (e.g., the internet). An online marketplace typically is accessed by network nodes (e.g., client user devices) operating web browsers that are capable of rendering web pages (e.g., XML, HTML, or XHTML web pages) that are associated with a unique reference (e.g., a uniform resource identifier (URI), such as or a uniform resource locator (URL)). A web page typically contains information, graphics, and hyperlinks to other web pages and files. A "web site" includes one or more web pages that are made available through what appears to users as a single web server.

As used herein the term "crowdsourced testing" refers to testing that is outsourced to a group of people or community through a general request for contributions that is made to a large group of people.

As used herein, the term "includes" means includes but not limited to, the term "including" means including but not limited to. The term "based on" means based at least in part on.

II. SOFTWARE APPLICATION TESTING

An important factor that differentiates software application marketplaces is the trade-off between the number and the quality of the products they offer. This trade-off can be restated in terms of users' risks and product assortment. For example, if a marketplace is open and any software application is allowed to be traded, then users are offered a large variety of products, but, at the same time, they are exposed to the risk of downloading defective products that may harm their machines. In an effort to guarantee some level of quality and security to the users, the market manager may run certification processes on the products. However, depending on their costs, these processes affect seriously the number of products that can be offered in the marketplace. Indeed, the manager needs to decide: (1) which products to test; and (2) when to test different products. The embodiments that are described herein provide systems and methods that enable crowdsourced testing of software applications for certification and distribution. These systems and methods enable marketplace managers to balance the trade-off between number and quality of products creating a safe environment for testing and delegating the choices of what and when to test to the users.

FIG. 1 shows an embodiment of a software application testing environment 10 that includes an online marketplace provider 12, software application providers 14, 16, and user devices 18, 20, 22 that are interconnected by a communications network 26. The software application providers 14, 16 provide one or more respective software applications 28 to the online marketplace provider 12. The online marketplace provider 12 manages the software applications 28 and enables the user devices 18-22 to have conditional access to selected ones of the software applications 28. In some embodiments, the software applications 28 are indexed by a database that associates the software applications with respective classification labels (e.g., "certified" and "uncertified").

The online marketplace provider 12 typically manages transactions that create or exchange value between any of the online marketplace provider 12, the software application providers 14, 16, and the user devices 18-22. For example, in some embodiments, the online marketplace provider 12 manages transactions involving the transfer of ownership or rights to use the software applications 28 from the software application providers 14, 16 to the users of the user devices 18-22 subject to receipt of consideration (e.g., payment) from the users of the user devices. The software applications that are eligible for such transactions, however, typically are limited to those that have passed certain quality control tests (referred to herein as "certified software applications"). As explained in detail below, these tests may be performed at least in part by the users of the user devices 18-22.

Figure 2:
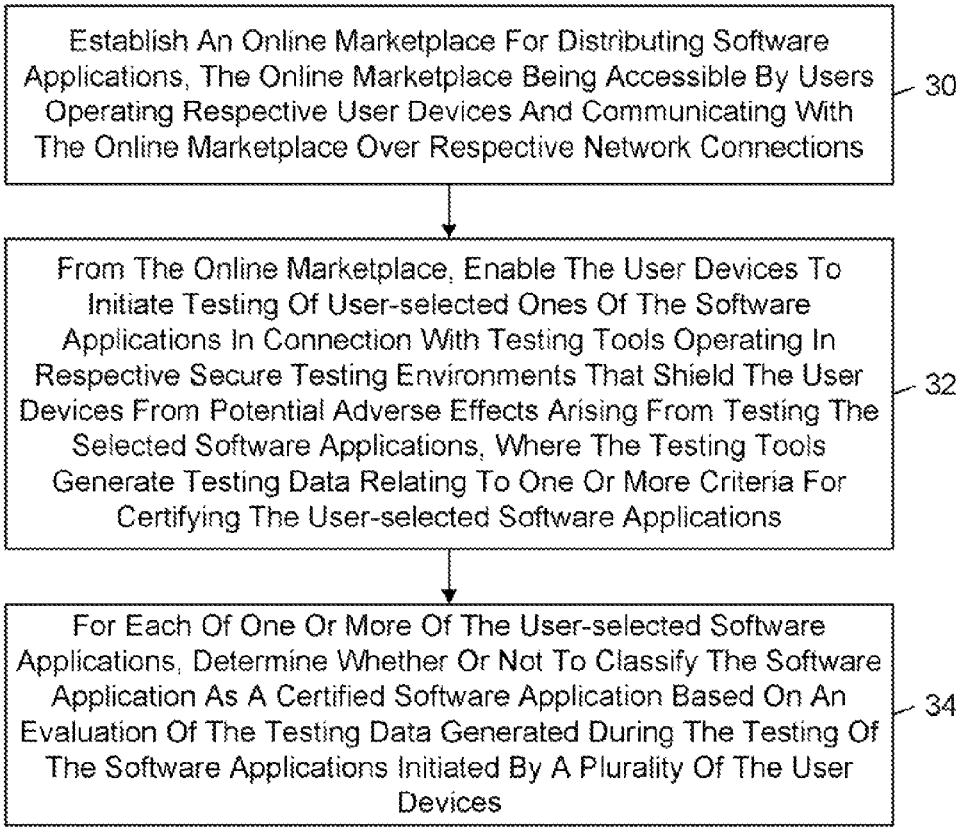
FIG. 2 is a flow diagram of an example of an embodiment of a software application testing method.

FIG. 2 shows an embodiment of a method that is performed by the online marketplace provider 12 in enabling crowd-sourced testing of software applications for certification and distribution.

In accordance with the method of FIG. 2, the online marketplace provider 12 establishes an online marketplace for distributing software applications 28 (FIG. 2, block 30). The online marketplace is accessible by users operating respective user devices 18-22 and communicating with the online marketplace over respective network connections. From the online marketplace, the online marketplace provider 12 enables the user devices 18-22 to initiate testing of user-selected ones of the software applications 28 in connection with testing tools operating in respective secure testing environments that shield the user devices 18-22 from potential adverse effects arising from testing the selected software applications 28 (FIG. 2, block 32). In operation, the testing tools generate testing data relating to one or more criteria for certifying the user-selected software applications. For each of one or more of the user-selected software applications 28, the online marketplace provider 12 determines whether or not to classify the software application as a certified software application based on an evaluation of the testing data generated during the testing of the software applications initiated by a plurality of the user devices (FIG. 2, block 34).

Figure 3:
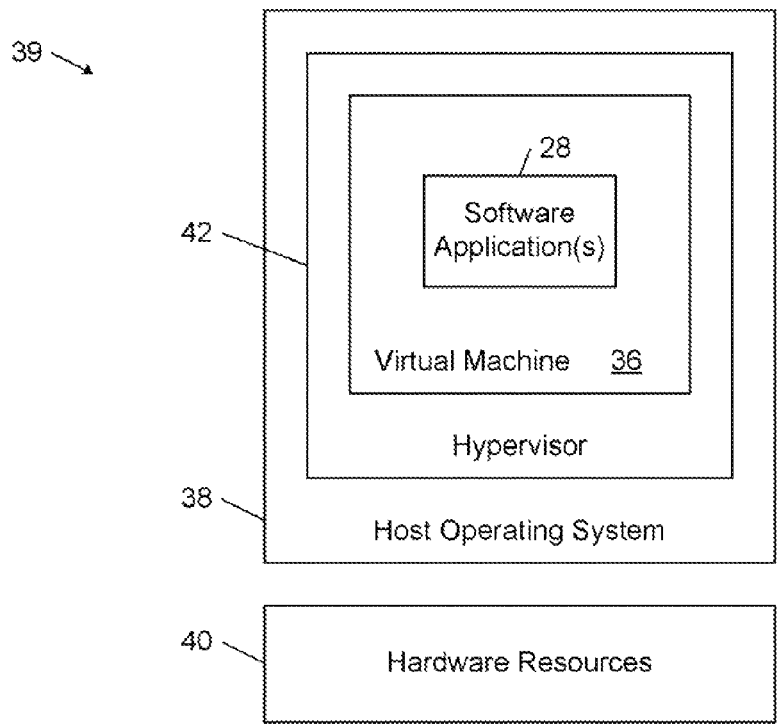
FIG. 3 is a block diagram of an example of an embodiment of a system providing a secure testing environment.

Referring to FIG. 3, in the process of enabling the user devices 18-22 to initiate testing of user-selected ones of the software applications 28, an example of an embodiment of the online marketplace provider 12 provides the user devices 18-22 with access to a virtual machine 36 that creates a secure testing environment that provides hardware security and fault isolation during execution of a respective one of the software applications 28. The virtual machine 36 is hosted by an operating system 38 executing on a host computer system 39 (e.g., a client user device or a server computer). The operating system 38 shares hardware resources 40 with the virtual machine 36. A hypervisor 42 (also referred to as a virtual machine manager) is a software application program that handles resource and memory allocation for the virtual machine 36 such that the virtual machine 36 remains isolated from other software components. In this way, software applications 28 running inside the virtual machine 36 are limited to the resources and abstractions provided by the virtual machine 36. In the illustrated embodiment, the hypervisor 42 runs within the environment created by the operating system 38. In other embodiments, the hypervisor 42 run directly on the host computer system hardware as a hardware control and guest operating system monitor. In operation, any of the software applications 28 may be installed on the host computer system 39 as a virtualization product just like any other software application, while still being able to use the resources of the host operating system 38.

In some embodiments, instances of the virtual machine 36 are installed on the user devices 18-22. In other embodiments, instances of the virtual machine 36 are installed on one or more remote testing servers that are accessible by the user devices 18-22.

Figure 4:
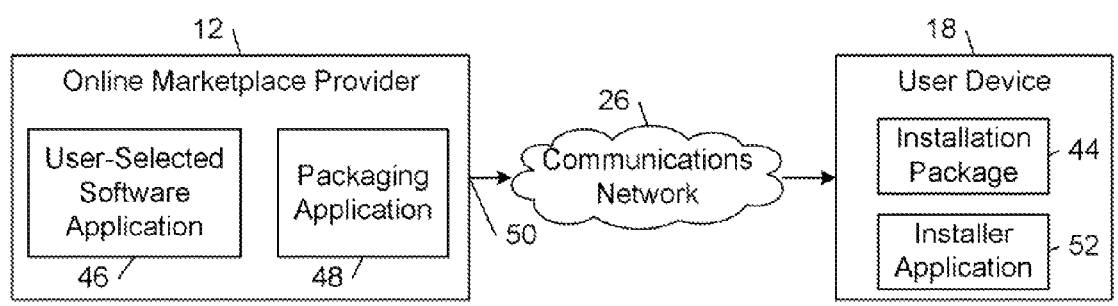
FIG. 4 is a block diagram of an example of an embodiment of an online marketplace provider providing an installation package for installing a secure testing environment on an example of an embodiment of a user device.

FIG. 4 shows an example of an embodiment of the online marketplace provider 12 providing an installation package 44 for installing a secure testing environment on an example of an embodiment of the user device 18. The online marketplace provider 12 processes a user-selected one 46 of the software applications 28 with a packaging application 48 to create a downloadable version 50 of the installation package 44. The downloadable version 50 of the installation package 44 is downloadable from a specified network location (e.g., a unique URL) to respective ones of the user devices over respective network connections. In the illustrated embodiment, each instance of the installation package includes an installer application 52 that includes installation program code for installing on the user device an instance of the virtual machine 36 and the associated user-selected one 46 of the software applications 28 along with one or more testing tools. In other embodiments, the installer application 52 may be separately provided and installed on the user device 18. The testing tools may be separate from or integrated with the user-selected software application 46. When the testing tools are integrated with a software application, the combination is referred to as an "instrumented version of the software application." When installed on the user device 18, the virtual machine 36 runs on the respective user device 18 and, in turn, the user-selected software application 46 along with the one or more testing tools run in the secure testing environment provided by the virtual machine 36.

Figure 5:
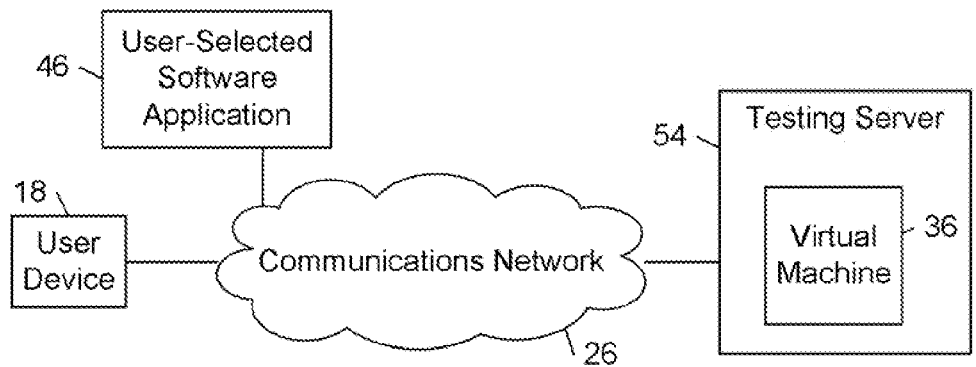
FIG. 5 is a block diagram of an example of an embodiment of a remote testing server providing a secure testing environment for an example of an embodiment of a user device.

FIG. 5 shows an example of an embodiment of a remote testing server 54 providing a secure testing environment for an example of an embodiment of the user device 18. In this example, the online marketplace provider 12 provides the user device 18 with access to at least one remote server network node running an instance of the virtual machine 36 on behalf of the user device 18 to provide a secure testing environment in which the user-selected software application 46 and the associated testing tools can operate. The testing tools may be separate from or integrated with the user-selected software application 46. When installed on the testing server 40, the virtual machine 36 runs on the testing server 40 and, in turn, the user-selected software application 46 along with the one or more testing tools run in the secure testing environment provided by the virtual machine 36.

Figure 6:
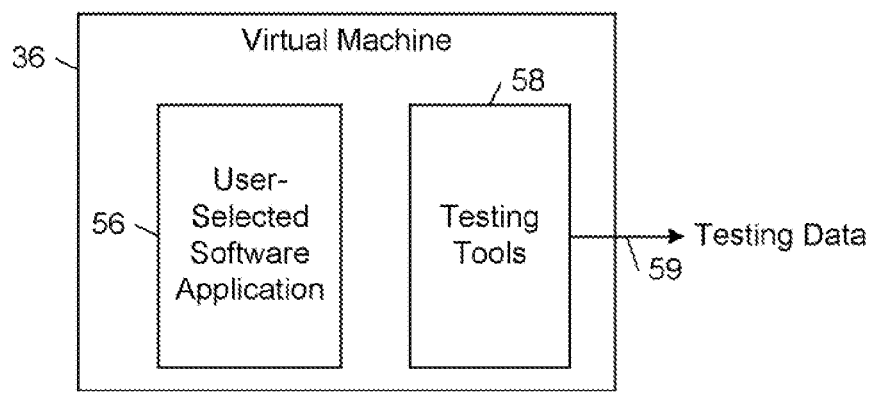
FIG. 6 is a block diagram of an example of an embodiment of a secure testing environment.

FIG. 6 shows an example embodiment of a secure testing environment that is provided by an instance of the virtual machine 36 in which are running an instance 56 of the user-selected software application 46 and a separate set of one or more testing tools 58. This embodiment of the virtual machine 36 may run on any of the remote testing server 54 and the user devices 18-22. In this embodiment, the testing tools 58 collect information about the behavior of the user-selected software application 56 as it is used. Examples of the type of information that may be collected include factors such as executed software code, failed assertions, software failures, and software usage. In some embodiments, the testing tools typically generate testing data relating to risk posed by installation of the user-selected software applications on the user devices. After generating testing data 59 during operation of the user-selected software application 56, the testing tools 58 typically transmit the testing data 59 to the online marketplace provider 12 for analysis.

Figure 7:
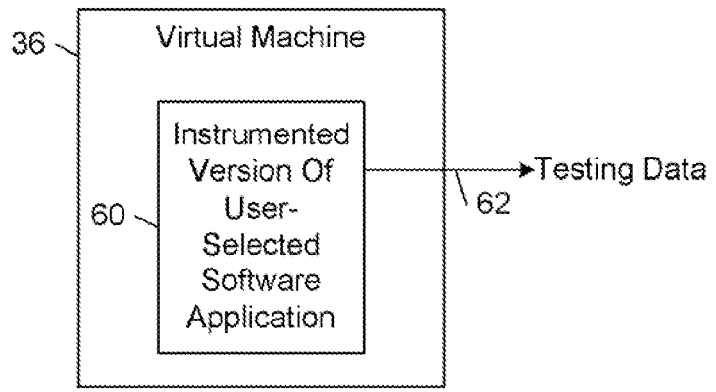
FIG. 7 is a block diagram of an example of an embodiment of a secure testing environment.

FIG. 7 shows an example embodiment of a secure testing environment that is provided by an instance of the virtual machine 36 in which is running an instrumented version 60 of the user-selected software application 46 that includes an integrated set of one or more testing tools. This embodiment of the virtual machine 36 may run on any of the remote testing server 54 and the user devices 18-22. In this embodiment, the testing uses instrumentation that is embedded in the software application 60 to collect information about the behavior of the user-selected software application 46 as it is used. Examples of the type of information that may be collected include factors such as executed software code, failed assertions, software failures, and software usage. In some embodiments, the testing tools typically generate testing data relating to risk posed by installation of the user-selected software applications on the user devices. In some embodiments, the instrumented version 60 of the user-selected software application 46 is generated by a residual testing tool that incorporates additional code to the core functionality of the user-selected software application 46. After generating testing data 62 generated during operation of the instrumented version 60 of the user-selected software application, the embedded testing tools typically transmit the testing data 62 to the online marketplace provider 12 for analysis.

In some embodiments, the online marketplace provider 12 divides the software applications products that are traded in the marketplace into two groups: "certified" applications, and "new" (uncertified) applications. On the online marketplace, the online marketplace provider 12 presents certified ones of the software applications as being available for sale and presents uncertified ones of the software applications as being only available for testing in the respective secure testing environments. Users of the user devices 18-22 can download any "certified" application directly onto their respective devices 18-22, whereas such users can download "new" applications only into secure testing environments in which one or more certification tests are performed.

Based on an evaluation of the testing data generated during the testing of the software products initiated by a plurality of the user devices, the online marketplace provider 12 decides whether to reclassify the new software applications as certified software application, to leave them in the uncertified software application group, or to remove them from the marketplace. In this process, the online marketplace provider 12 collects all testing data produced during the testing procedure in the secure testing environments created in the remote testing server 54 or the user devices 18-22 for testing the uncertified software applications. After collecting information from tests requested by a sufficient number of users, the online marketplace provider 12 can promote the new application to the rank of certified application (e.g., if the tests are positive), leave the new application in the uncertified class (e.g., if the results are inconclusive), or exclude it from the marketplace (e.g., if the tests are negative).

In some embodiments, the online marketplace provider 12 requests each individual user to provide a unique identifier before gaining access to specific new applications. In this way, the certification procedure can be personalized. For example, in some embodiments, the certification testing data can be segmented into classes corresponding to the user classes assigned to the users performing the testing. In this case, the certification of a particular application can be made segment-specific, enabling a software application to be certified for one user class and remain uncertified for another user class.

The online marketplace provider 12 may present certified and uncertified software applications to user devices in a variety of different ways. For example, the online marketplace provider 12 may present the availability of the certified and uncertified software applications on one or more pages of a web site from which the user devices may download the software applications. The online marketplace provider 12 also may present the availability of the certified and uncertified software applications in direct or indirect solicitations, such as electronic messages (e.g., electronic mail messages or SMS protocol based text messages) that are sent directly to the user devices and electronic messages (e.g., advertisements) that are posted on various web pages. In some embodiments, these electronic messages solicit users to participate in testing the uncertified software applications.

In some embodiments, the online marketplace provider 12 may offer incentives for the users to initiate testing of respective ones of the software applications. For example, the online marketplace provider 12 may provide incentives to the users in order to test a specific application in exchange for price discounts on the application and promotional offers (e.g., offering discounts on a popular "certified" application if downloaded with a "new" one). The information collected from previous users' downloads of "new" applications can be used to design incentive schemes. In some embodiments, the online marketplace provider 12 offers at least one of the incentives in response to a determination that the test results generated for a respective one of the software applications satisfies an offer-triggering condition. For example, the online marketplace provider 12 may offer the at least one incentive in response to determination that testing of the respective software application has reached an intermediate testing level that is below a threshold testing level needed to make a determination whether or not to classify the respective software application as a certified software application. An example may be to give incentives to download applications that are "almost" certified in order to reduce the time needed to complete the certification process.

To provide incentives the online marketplace provider 12 can publish data derived from the testing data generated during the testing of the software applications initiated by a plurality of the user devices. As an example, the online marketplace provider 12 can publish information about past tests results (in the format of a rating system, for example). If all information is disclosed, then the certification process becomes completely transparent to the community.

III. EXAMPLE OPERATING ENVIRONMENTS

The user devices 18-22 may be implemented by any type of network-enabled device, including any one of a wide variety of digital and analog electronic devices, including server computers, desktop computers, workstation computers, and portable electronic devices (e.g., mobile phones, laptop and notebook computers, digital still image cameras, digital video cameras, and personal digital assistants).

The software application providers 14, 16 also may be implemented by any type of network-enabled device, including any one of a wide variety of digital and analog electronic devices, including server computers, desktop computers, workstation computers, and portable electronic devices (e.g., mobile phones, laptop and notebook computers, digital still image cameras, digital video cameras, and personal digital assistants).

Embodiments of the online marketplace provider 12 may be implemented by one or more discrete modules (or data processing components) that are not limited to any particular hardware, firmware, or software configuration. In the illustrated embodiments, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

The modules of the online marketplace provider 12 may be co-located on a single physical processing device or they may be distributed across multiple physical processing devices; if distributed across multiple physical processing devices, these modules may communicate with each other over local wired or wireless connections, or they may communicate over global network connections (e.g., communications over the Internet).

In some implementations, process instructions (e.g., machine-readable code, such as computer software) for implementing the methods that are executed by the embodiments of the online marketplace provider 12, as well as the data they generate, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the online marketplace provider 12 may be implemented in any one of a wide variety of electronic devices, including desktop computers, workstation computers, and server computers.

Figure 8:
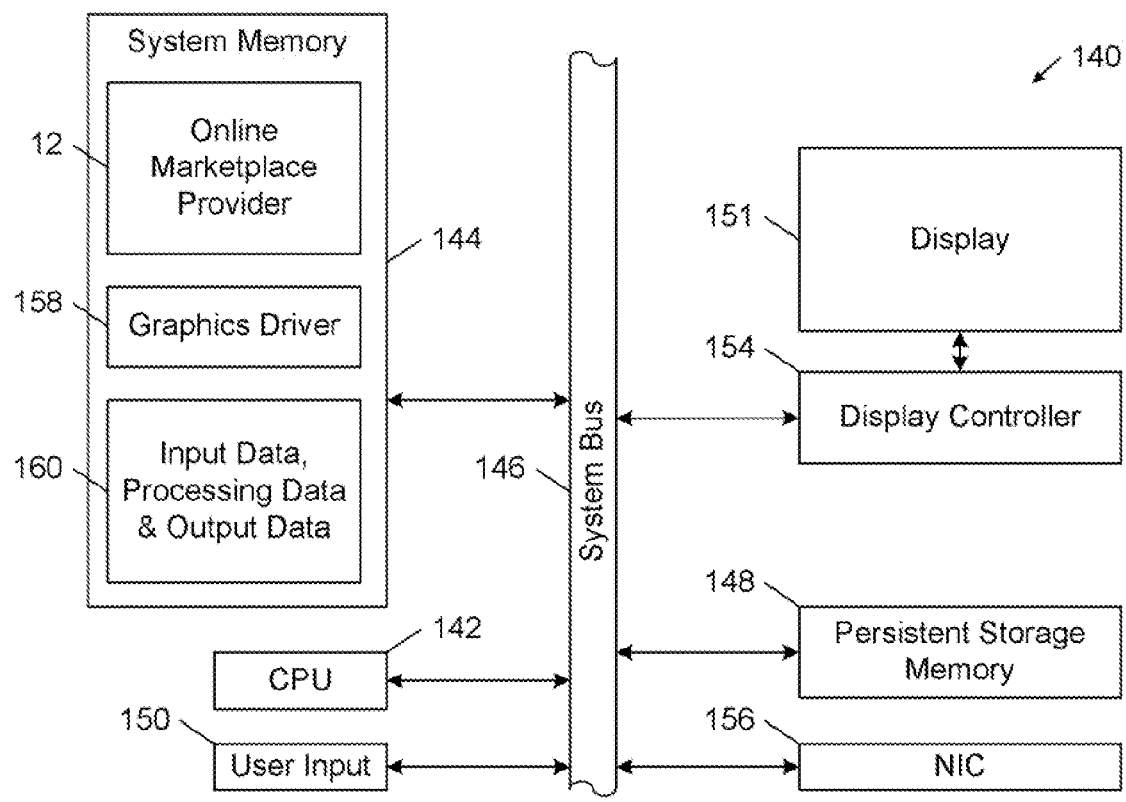
FIG. 8 is a block diagram of an example of an embodiment of a computer implementing an example of an embodiment of the online marketplace provider of FIG. 1.

FIG. 8 shows an example embodiment of a computer system 140 that can implement any of the embodiments of the online marketplace provider 12 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 8, the system memory 144 also stores the online marketplace provider in the form of a software application program. The system memory 144 also stores a graphics driver 158, and processing information 160 that includes input data, processing data, and output data. In some embodiments, the online marketplace provider 12 interfaces with the graphics driver 158 to present a user interface on the display 151 for managing and controlling the operation of the online marketplace provider 12.

IV. CONCLUSION

The embodiments that are described herein provide systems and methods that enable crowdsourced testing of software applications for certification and distribution. These systems and methods are designed to balance the trade-off between number and quality of products creating a safe environment for testing and delegating the choices of what and when to test to the users.

Other embodiments are within the scope of the claims.

The invention claimed is:

1. A method, comprising by a computer system:
establishing an online marketplace for distributing software applications, the online marketplace being accessible by devices communicating with the online marketplace over respective network connections;
from the online marketplace, enabling the devices to select respective ones of the software applications and initiate testing of the selected software applications in connection with testing tools operating in respective secure testing environments that shield the devices from potential adverse effects arising from testing the selected software applications, wherein the testing tools generate testing data relating to one or more criteria for certifying the selected software applications; and
for each of one or more of the selected software applications, determining whether or not to classify the software application as a certified software application based on an evaluation of the testing data generated during the testing of the software applications initiated by a plurality of the devices.

2. The method of claim 1, wherein the enabling comprises providing access to a virtual machine that provides a secure testing environment providing hardware security and fault isolation during execution of a respective one of the software applications.

3. The method of claim 2, wherein the providing comprises providing an installation package downloadable from a specified network location to respective ones of the devices over respective network connections, each instance of the installation package comprises installation program code for installing the virtual machine and a respective one of the selected software applications along with one or more of the testing tools on a respective one of the devices, and when installed on the respective device the virtual machine runs on the respective device and the respective selected software application along with the one or more testing tools run in the secure testing environment provided by the virtual machine.

4. The method of claim 2, wherein the providing comprises providing access to at least one remote server network node running instances of the virtual machine on behalf of respective ones of the devices to provide respective secure testing environments in which respective ones of the selected software applications operate and respective ones of testing tools generate the testing data.

5. The method of claim 1, further comprising from the online marketplace offering incentives for initiating testing of respective ones of the software applications.

6. The method of claim 5, wherein at least one of the incentives comprises a software application price discount given in exchange for testing a respective one of the software applications.

7. The method of claim 5, wherein the offering comprises offering at least one of the incentives in response to a determination that the test results generated for a respective one of the software applications satisfies an offer-triggering condition.

8. The method of claim 7, wherein the offering comprises offering the at least one incentive in response to determination that testing of the respective software application has reached an intermediate testing level that is below a threshold testing level needed to make a determination whether or not to classify the respective software application as a certified software application.

9. The method of claim 1, further comprising:
on the online marketplace, publishing data derived from the testing data generated during the testing of the software applications initiated by a plurality of the devices.

10. The method of claim 1, further comprising:
on the online marketplace, presenting certified ones of the software applications as being available for sale and presenting uncertified ones of the software applications as being only available for testing in the respective secure testing environments.

11. The method of claim 1, wherein the testing tools generate testing data based on execution of the selected ones of the software applications in the secure testing environments.

12. The method of claim 1, wherein the testing tools generate testing data relating to risk posed by installation of the selected software applications on the devices.

13. Apparatus, comprising:
a computer-readable medium storing computer-readable instructions; and
a data processor coupled to the computer-readable medium, operable to execute the instructions, and based at least in part on the execution of the instructions operable to perform operations comprising
establishing an online marketplace for distributing software applications, the online marketplace being accessible by devices communicating with the online marketplace over respective network connections,
from the online marketplace, enabling the devices to select respective ones of the software applications and initiate testing of the selected software applications in connection with testing tools operating in respective secure testing environments that shield the devices from potential adverse effects arising from testing the selected software applications, wherein the testing tools generate testing data relating to one or more criteria for certifying the device-selected software applications, and
for each of one or more of the device-selected software applications, determining whether or not to classify the software application as a certified software application based on an evaluation of the testing data generated during the testing of the software applications initiated by a plurality of the devices.

14. The apparatus of claim 13, wherein in the enabling the data processor is operable to perform operations comprising providing access to a virtual machine that provides a secure testing environment providing hardware security and fault isolation during execution of a respective one of the software applications.

15. The apparatus of claim 13, wherein the data processor is operable to perform operations comprising:
from the online marketplace offering incentives for initiating testing of respective ones of the software applications.

16. The apparatus of claim 13, wherein the data processor is operable to perform operations comprising:
on the online marketplace, presenting certified ones of the software applications as being available for sale and presenting uncertified ones of the software applications as being only available for testing in the respective secure testing environments.

17. At least one non-transitory computer-readable medium having computer-readable program code embodied therein, the computer-readable program code adapted to be executed by a computer to implement a method comprising:
establishing an online marketplace for distributing software applications, the online marketplace being accessible by devices communicating with the online marketplace over respective network connections;
from the online marketplace, enabling the devices to select respective ones of the software applications and initiate testing of the selected software applications in connection with testing tools operating in respective secure testing environments that shield the devices from potential adverse effects arising from testing the selected software applications, wherein the testing tools generate testing data relating to one or more criteria for certifying the selected software applications; and
for each of one or more of the selected software applications, determining whether or not to classify the software application as a certified software application based on an evaluation of the testing data generated during the testing of the software applications initiated by a plurality of the devices.

18. The at least one non-transitory computer-readable medium of claim 17, wherein the enabling comprises providing access to a virtual machine that provides a secure testing environment providing hardware security and fault isolation during execution of a respective one of the software applications.

19. The at least one non-transitory computer-readable medium of claim 17, wherein the method further comprises:
from the online marketplace offering incentives for initiating testing of respective ones of the software applications.

20. The at least one non-transitory computer-readable medium of claim 17, wherein the method further comprises:
on the online marketplace, presenting certified ones of the software applications as being available for sale and presenting uncertified ones of the software applications as being only available for testing in the respective secure testing environments.

* * * * *